INVENTOR.
F.J. ZAVASNIK
BY Hudson and Young
ATTORNEYS

INVENTOR.
F. J. ZAVASNIK
BY Hudson & Young
ATTORNEYS

United States Patent Office 3,108,324
Patented Oct. 29, 1963

3,108,324
METHOD AND MEANS FOR MANUFACTURE OF BIAXIALLY ORIENTED THERMOPLASTIC FILM
Fredrick J. Zavasnik, Bartlesville, Okla., assignor to Phillips Petroleum Company, a corporation of Delaware
Filed Nov. 10, 1960, Ser. No. 68,563
13 Claims. (Cl. 18—14)

This invention relates to the manufacture of thin-walled, continuous, seamless tubing or sheeting of thermoplastic materials. In one of its aspects it relates to a method and means for the manufacture of biaxially oriented seamless tubing at a much faster rate than is possible by the methods and means heretofore known.

The prior art methods for the manufacture of thermoplastic films have included calendering, casting and extrusion. The calendering and casting methods are usually restricted to producing sheeting whereas the extrusion method provides a choice of continuous sheeting or continuous thin-walled tubing. Methods and means for cooling the extruded tubing in a liquid bath have been proposed but have not proven successful for the high speed production of thermoplastic tubing for lack of adequate circulation of the cooling liquid or because of excessive heat removal from the die by the cooling liquid, or for other reasons.

It is therefore a principal object of this invention to provide a method and means for the continuous extrusion of thermoplastic tubing at a much faster rate than has heretofore been possible. It is also an object of this invention to provide a method and means for the continuous production of biaxially oriented thermoplastic film at higher speeds than has heretofore been possible. Another object of this invention is the provision of a method and means for utilizing a water cooling bath during, as well as after, the stretching operation in the formation of continuous thermoplastic tubing. Still another object of this invention is in the provision of a thermal barrier between the cooling water and the extruder die so as to avoid the excessive extraction of heat from the die by the cooling water. Other objects, features and advantages of this invention will become apparent to one skilled in the art upon study of this disclosure including the detailed description of the invention and the attached drawing wherein:

Figure 2:
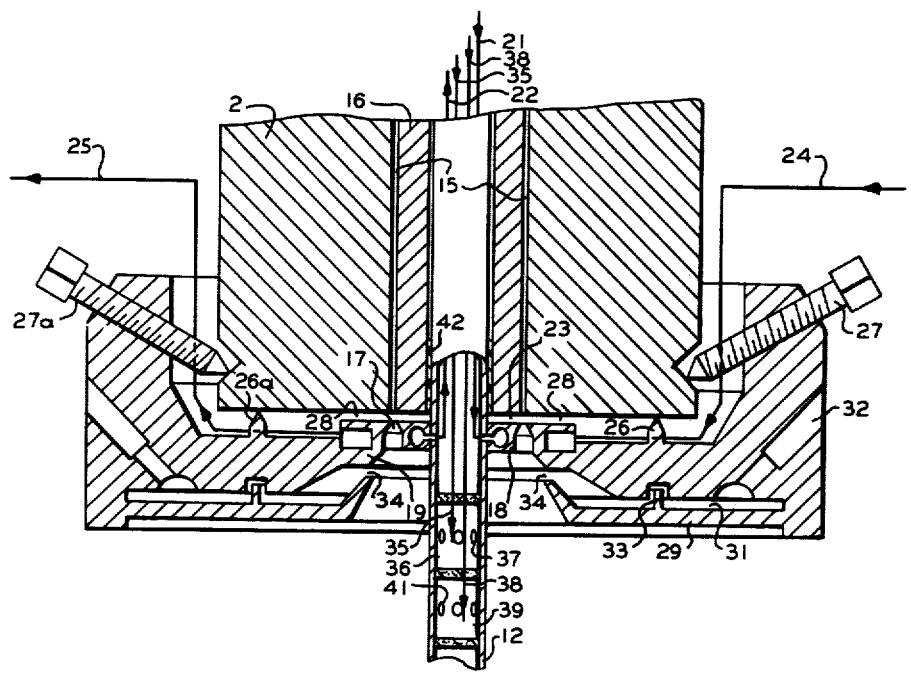
FIGURE 2 is an enlarged cross section through the extruder die and the elements immediately associated therewith.
Figure 5:
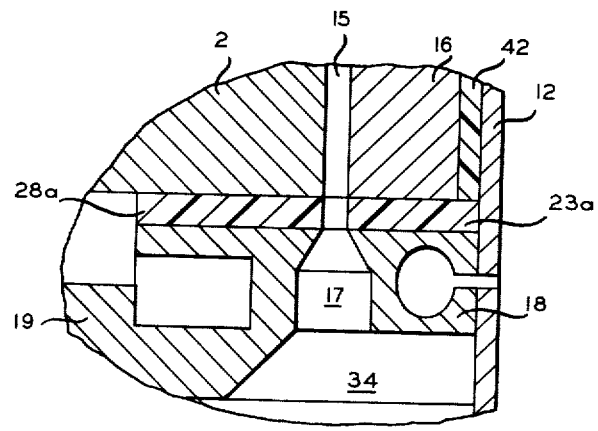
Figure 6:
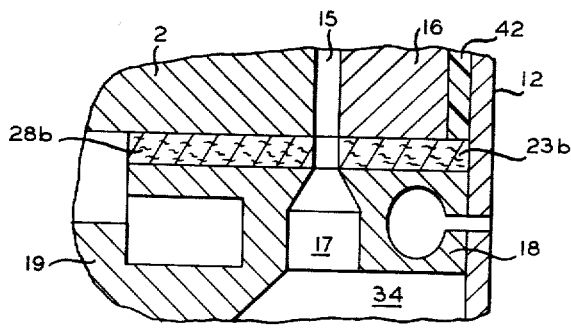
Figure 7:
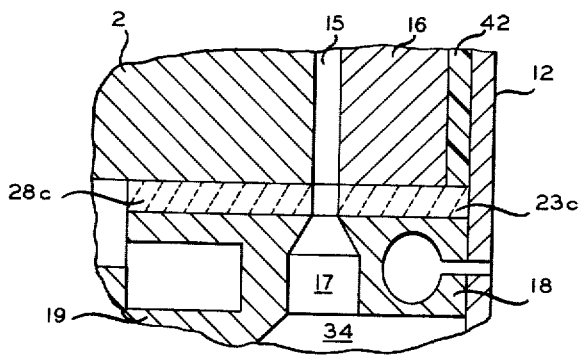

FIGURE 5 is a detail of a portion of the apparatus of FIGURE 2 wherein the spaces identified as 23a and 28a, corresponding to spaces 23 and 28 of FIGURE 2, contain a plastic composition;

FIGURE 6 is a detail similar to that of FIGURE 5 wherein the spaces contain a mineral fiber composition identified as 23b and 28b; and FIGURE 7 is a detail similar to those of FIGURES 5 and 6 wherein the spaces contain a ceramic material identified as 23c and 28c.

Broadly, the invention contemplates extruding a plasticized thermoplastic material through an annular orifice between a mandrel and die. The extrudate is then forced to fill an annular orifice between a water-cooled outer heat barrier and forming ring and an inner water-cooled heat barrier and forming ring wherein the last-named annular orifice is of increasing cross-sectional area in the direction of flow of thermoplastic material so that the wall thickness of the extruded tubing is increased at this point. The extruded tubing is forced to assume this thicker-walled property by controlling its rate of travel so that its removal rate is slower than the extruded tubing rate. The tubing, of increased wall thickness, leaves the surface of the forming rings and is supported and cooled by submergence in a water bath, at the same time being stretched over an expander ring so as to provide the desired tubing diameter. The level of the water inside the film bubble is adjusted to give the desired pressure differential, with respect to the water outside the bubble, to minimize drag created by the expander ring.

Figure 1:
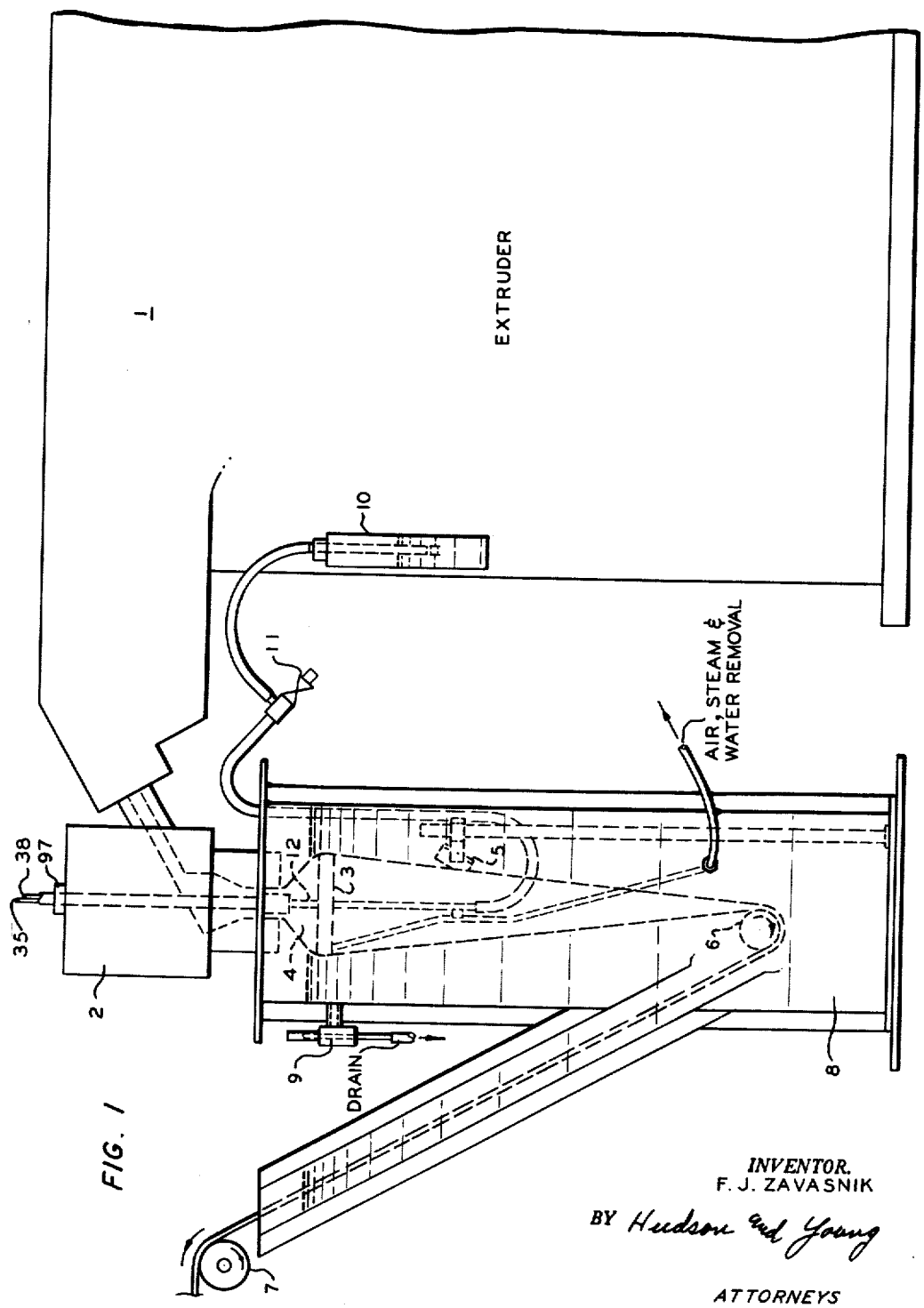
FIGURE 1 is a side elevation, partly in section, of an apparatus suitable for carrying out the present invention.

Referring now to the drawing, and to FIGURE 1 in particular, an extruder, indicated as 1, passes plasticized thermoplastic material through crosshead die 2 to form a continuous tubing of thermoplastic which is stretched by the combined action of expander ring 3 plus pressure of cooling water with or without additional air pressure in the zone 4 above the expander ring 3. The tubing is slit by knife 5 so as to allow water inside the bubble to escape and the resulting thermoplastic sheeting is flattened by rollers 6 and 7 and is passed to further processing such as drying and forming into sheets of desired dimensions.

The thermoplastic tubing is submerged in water contained in tank 8 and water in tank 8 is maintained at the desired level by liquid level control 9. Liquid level control 9 can be a conventional overflow pipe or other conventional means for maintaining a desired liquid level.

Air and water are supplied to zone 4 through expander ring support tube 12 by conduits 35 and 38. Air is exhausted through ports (not shown) immediately below chamber 39 of FIGURE 2, into conduit 12 and back pressure is maintained in zone 4 by valve 11 and manometer 10 of FIGURE 1. Water along with some steam and air is removed from the top of expander ring 3 in zone 4 by means of a separate conduit as illustrated. It is advisable to incorporate a water trap in the conduit from zone 4 to valve 11.

Referring now to FIGURE 2, the details of the extruder die and its associated elements will be described. The plasticized thermoplastic material is forced out of the annulus 15 between die 2 and the mandrel 16 and enters the annular orifice 17 between the inside forming ring 18 and the outside forming ring 19 where the wall thickness of the tubing is forced to conform to the increased cross-sectional area of annulus 17 by being removed from this annulus at a slower rate of travel than it is supplied to annulus 17. Inside forming ring 18 is internally cooled by a cooling fluid introduced by conduit 21 and removed by conduit 22 positioned in expander ring support tube 12. The inner forming ring 18 is spaced from mandrel 16 so that inner forming ring 18 provides a thermal barrier between mandrel 16 and the water in tank 8. The space 23 between inner forming ring 18 and mandrel 16 contributes to the thermal barrier.

Outer forming ring 19 is internally cooled by cooling fluid introduced via conduit 24 and removed via conduit 25. Outer forming ring 19 is secured to die 2 by point contacts indicated at 26, 26a, 27 and 27a so as to provide a space indicated at 28 between the internally cooled outer forming ring and the die 2. The internally cooled outer forming ring 19 and the space 28 cooperate to form a thermal barrier between the die 2 and the water in tank 8.

Cooling air distribution ring 29 is attached to outer forming ring 19 so as to provide an air passage 31 for air introduced via conduit 32. The air passes over baffle 33 and exits from orifice 34 directly onto the outer surface of the extruded tubing. Air is passed via conduit 35 to the chamber 36 in expander ring support tube 12 and exits via perforations 37 so as to pass directly onto the inner surface of the extruded tubing. Water is passed via conduit 38 to chamber 39 in expander ring support tube 12 and exits from perforations 41 into zone 4 above expander ring 3 of FIGURE 1.

Expander ring support tube 12 is insulated from mandrel 16 by an insulating sleeve 42 which can be made of a high melting point plastic such as Teflon (trademark).

Figure 3:
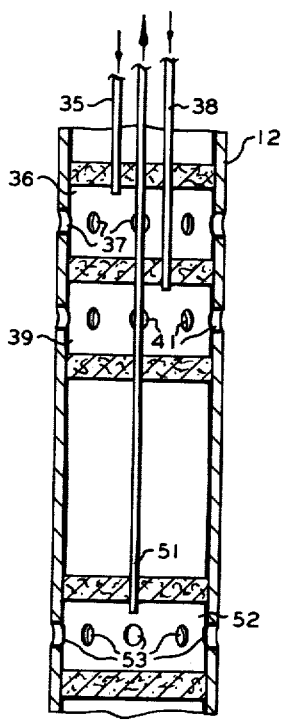
FIGURE 3 is a modification of the embodiment shown in FIGURES 1 and 2.

The principal reason for slitting the tubing with knife 5 is to provide an exit for the water collected in the tubing and to provide an exit for the pressure tube to manometer 10. In the event that a continuous thin-walled thermoplastic tubing is desired as the product, the modificaiton illustrated in FIGURE 3 can be employed. Thus, in FIGURE 3 another conduit can be placed in expander ring supporting tube 12 such as conduit 51 terminating in a chamber 52 having a plurality of perforations 53 so that cooling water introduced via conduit 38 and perforations 41 can be withdrawn through perforations 53 and conduit 51. The circulation can be reversed if so desired so that cooling water is removed via conduit 38 and introduced via conduit 51. Manometer 10 and bleed valve 11 are connected to conduit 35 so that when a slight excess of air pressure, over that required to stretch the tubing, is applied to conduit 35 the air pressure within the tubing can be regulated with the manometer and bleed valve.

The operation of the extrusion system illustrated in the drawing will now be described. The molten thermoplastic is extruded through the annular orifice 15, across the air space indicated at 23 and 28 and through the second orifice 17. Cooling water is circulated into and out of the interior of the extruded tubing in the zone indicated as numeral 4 in FIGURE 1. Air pressure is also supplied to this zone so that the extruded tubing is simultaneously cooled and stretched before passing over the expander ring 3. The exterior of the extruded tubing is also cooled by immersion in cooling water contained in vessel 8. The finished tubing is pulled over rollers 6 and 7 and expander ring 3 resists the pulling action so that the tubing is removed from the second orifice at a rate slower than it is supplied to the orifice whereby the tubing is forced to fill the increased cross-sectional area of the second orifice thus providing a seal which prevents access of water, steam or air to the extrusion head 2 and the orifice 15. The orifice 17 of increasing cross-sectional area also provides a relatively thick walled tube for stretching and processing without the necessity for extruding the tubing as a thick walled tube. The advantage of increasing the wall thickness of the tubing after it is extruded is that the extruder operates more efficiently against the back pressure provided by the orifice of lesser cross-sectional area. Thus, where the orifice in the cross head die is such as to produce a tube having a wall thickness of about ⅛-inch the second orifice can increase the tubing wall thickness to 3/16 of an inch and the extruder will operate more efficiently and produce a more uniform film than if the orifice in the cross head die is such as to produce a tubing having 3/16 of an inch wall thickness. The tubing is then stretched by the application of air pressure in zone 4 omnidirectionally so as to decrease the resistance offered by the expander ring 3 and so that the stretching will be substantially completed by the time the tubing passes over the expander ring 3.

During start up procedure cooling air is admitted by way of conduit 32 and orifice 34 to the exterior of the tubing substantially immediately after it leaves the orifice 17 and after the operation is stabilized the cooling air can be replaced with cooling water and the level of the cooling water in vessel 8 will be adjusted to the desired height. The water seal effected by the tubing in orifice 17 makes it possible for the water level to be raised to above the lower level of the cross head die 2. The inner forming ring 18 and the outer forming ring 19, being spaced from the cross head die 2 by the air spaces indicated at 23 and 28, provide a thermal barrier which prevents cooling of the cross head die 2 and the orifice 15. It should be noted that the outer forming ring 19 is spaced from the cross head die by point contacts indicated at 26, 26a, 27 and 27a.

The use of the extrusion apparatus of this invention makes possible much higher fabrication rates than have heretofore been possible in the industry. As an example, the apparatus of this invention makes possible the extrusion of tubular polyethylene film at rates of 100 to 250 pounds per hour whereas a comparable prior art apparatus is limited to fabrication of tubular film at rates of about 20 to 30 pounds per hour. The higher extrusion rates are made possible by the efficient use of water cooling and this, in turn, is made possible by the water seals and thermal barriers of the apparatus of this invention. Thus rapid cooling, efficient stretching, and reduction of post expansion stretching are achieved by the method and means of this invention to produce thermoplastic film or thermoplastic film tubing at high production rates.

Figure 4:
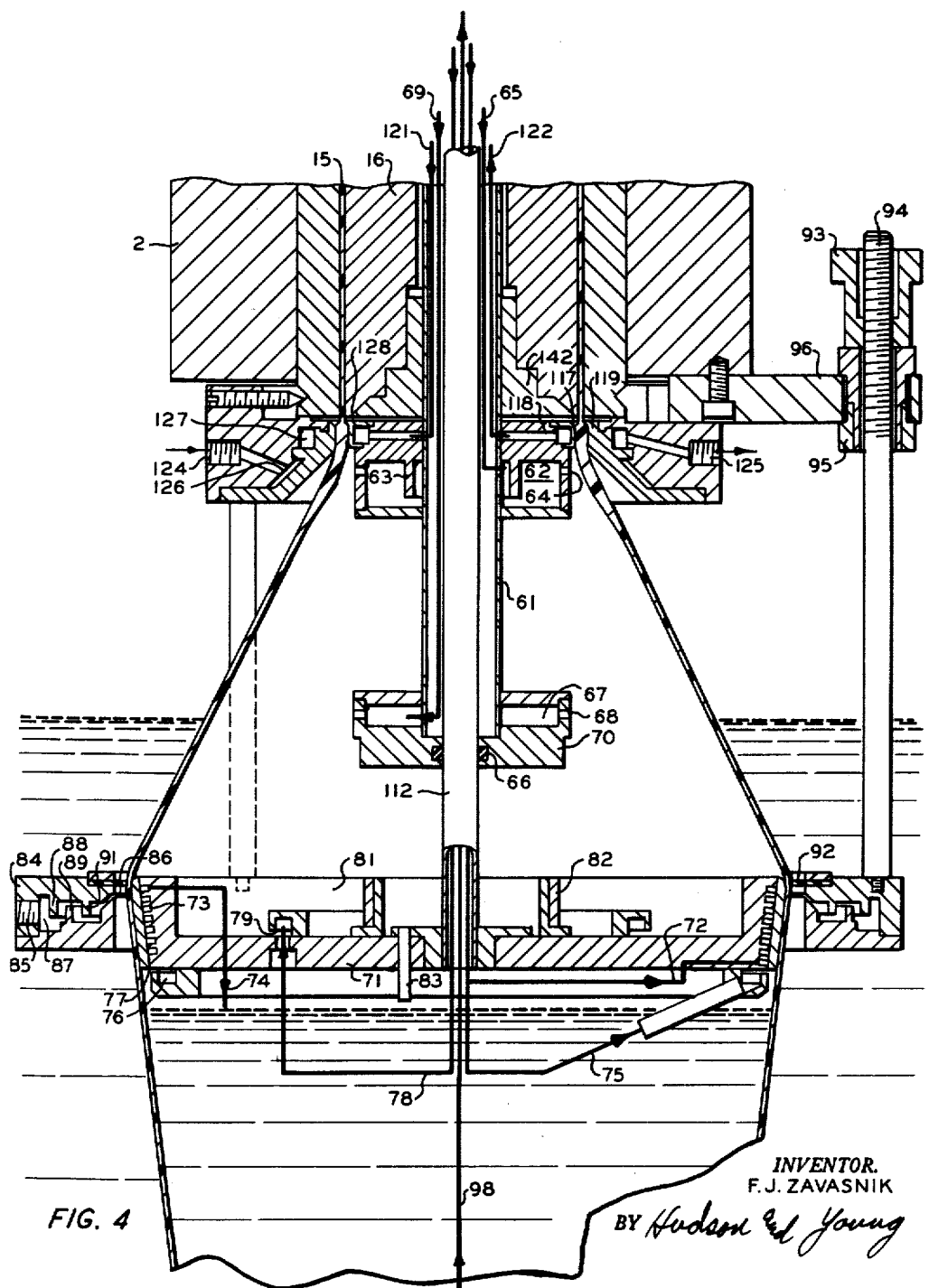
FIGURE 4 is another modification of the embodiment shown in FIGURES 1 and 2.

A preferred modification for producing a continuous thin-walled thermoplastic tubing is shown in FIGURE 4. In this modification the plasticized thermoplastic material is forced out of the annulus 15 between the die 2 and the mandrel 16 as in the device of FIGURE 2 and is thickened in annular orifice 117 between the inside forming ring 118 and the outside forming ring 119 substantially as described with reference to FIGURE 2. Inside forming ring 118 is internally cooled by a cooling fluid introduced by conduit 121 and removed by conduit 122, positioned in expander ring support tube 112. Inside forming ring 118 is supported by conduit 61 which, in turn, is secured to mandrel 16 by means of a nonmetal bushing 142 which can be made of the same material as bushing 42 of FIGURE 2. The lower portion of inside forming ring 118 comprises a chamber 62 containing a baffle 63 and peripheral perforations 64. Cooling fluid introduced via conduit 65 is sprayed upon the inner surface of the thermoplastic tubing extruded from annulus 15 and annular orifice 117. A bushing 70 is secured to the lowermost end of conduit 61 and contains a sealing ring 66 so as to support expander ring support tube 112 adjustably therein. The bushing 70 contains an annular chamber 67 therein and a plurality of peripheral outlets 68 so that cooling fluid introduced via conduit 69 is sprayed upon the inner surface of the extruded thermoplastic tubing.

Outside forming ring 119 is internally cooled by cooling fluid introduced at inlet 124 and removed at outlet 125 after having passed through inner connected channels 126 and 127. Inside forming ring 118 and outside forming ring 119 are spaced from die 2 and mandrel 16 so as to provide a separating space 128 between these elements.

Expander ring 71 is internally cooled around its periphery by cooling fluid introduced via conduit 72 which traverses the spiral channels 73 and is exhausted via conduit 74 into the bubble formed by the plastic tubing below expander ring 71. Cooling fluid is introduced via conduit 75 to annular chamber 76 and is passed as a spray from orifice 77 onto the inner surface of the plastic tubing as it passes over expander ring 71. Cooling fluid is introduced via conduit 78 and annular outlet 79 into chamber 81. The cooling fluid then overflows weir 82 and is exhausted via drain 83 into the bubble formed by the plastic tubing below the expander ring 71.

Outer cooling ring 84 has a conduit inlet 85 and a spray outlet 86 connected by a chamber 87 containing baffles 88, 89 and 91. Cooling fluid introduced via inlet 85 is sprayed upon the outer surface of the plastic tubing as it passes over expander ring 71. A flexible wiper blade 92 contacts the plastic tubing as it passes over expander ring 71 so as to dislodge and remove air bubbles which may be accumulated thereon.

Outer cooling ring 84 is vertically adjustable by means of threaded nut 93 which engages the threaded section of shaft 94. Bushing 95 is free to move upon shaft 94 and within support arm 96 to facilitate rotation of nut 93.

Expander ring 71 is also vertically adjustable by means of nut 97 of FIGURE 1 which rests upon die 2 and threadably engages a threaded portion of the expander ring support tube.

Cooling fluid which is introduced into the bubble of thermoplastic tubing is removed via conduit 98 and can be removed at a rate sufficient to maintain the desired pressure within the thermoplastic bubble by means described with reference to the preceding figures.

The thermal barrier indicated as an air space at 23 and 28 of FIGURE 2 and at 128 of FIGURE 4 allows cooling of the extruded film immediately downstream from the annular orifice 17 of FIGURE 2 and the corresponding annular orifice 117 of FIGURE 4 without substantial cooling of the die and mandrel of the extruder crosshead. The thermal barrier can be an air space as indicated or the space can contain a solid insulating material such as a ceramic, high melting point plastic, or mineral fiber composition. Teflon (trademark) is an example of high melting point plastic composition and asbestos paper is an example of mineral fiber composition.

The thermal barrier can be from about 0.001 to about 0.015 inch in thickness whether it is an air space or a solid insulating material. An air space is preferred to a solid insulating material because of its lower heat transfer coefficient characteristic.

When the thermal barrier is an air space, the cross-sectional dimension of the annular orifice 17 of FIGURE 2 and the corresponding annular orifice 117 of FIGURE 4 should be somewhat larger than that of the annular orifice of the extruder, e.g., about 0.01 inch larger. This increase in orifice size will accommodate any expansion on the part of the plasticized thermoplastic material.

It is a feature of the invention that rapid cooling, efficient stretching, and reduction of post expansion stretching are provided in the production of film at high extrusion rates.

That which is claimed is:

1. In the method of producing a continuous biaxially oriented linear polymer film tube wherein the molten polymer is extruded in the form of a tube, the tube is cooled, collapsed and recovered as a flattened tube, the improvement comprising passing the extrudate from the die across a thermal barrier; through an annular orifice of increasing cross-sectional area at a slower linear rate than that at which the polymer is extruded through said die so as to form a water seal; immersing the tube in cooling water immediately downstream from said annular orifice; circulating cooling water into and out of and in direct contact with said tube immediately downstream from said annular orifice; maintaining fluid pressure within the interior of said tube immediately downstream from said annular orifice sufficient to stretch said tube; passing the stretched tube over a forming ring; and removing the tube from the cooling water.

2. Process of claim 1 wherein the thermal barrier is an air space of not more than about 0.015 inch.

3. Process of claim 1 wherein the thermal barrier is a solid insulating material.

4. Process of claim 3 wherein the insulating material is a high melting point plastic.

5. Process of claim 3 wherein the insulating material is a ceramic material.

6. Process of claim 3 wherein the insulating material is a mineral fiber.

7. In the method of producing a continuous biaxially oriented linear polymer film tube the steps of extruding molten thermoplastic in tubular form from an annular die opening across a thermal barrier and through an annular orifice of increasing cross-sectional area in the direction of flow of the thermoplastic material; removing the tube from the orifice at a slower rate than it is extruded from the die so that the extrudate is forced to fill the increased cross-sectional area of the orifice; passing the tubing into a vessel of cooling water and over an expander ring whose outside diameter is equal to the inside diameter of the finished tubing; circulating water into and out of the interior of the tubing and in direct contact with said tubing intermediate said orifice and said expander ring to cool said tubing; introducing air to the interior of the tubing intermediate said orifice and said expander ring to stretch omnidirectionally the tubing; and removing the tubing from the vessel of cooling water.

8. Apparatus for forming biaxially oriented linear polymer film tubing comprising, in combination, an extrusion head containing a first annular orifice for extruding molten polymer; a tubular member axially disposed with respect to said orifice; an inside forming ring secured to said tubular member adjacent to and spaced from said extrusion head and having its outer periphery aligned with the inside of said orifice; an outside forming ring adjacent to and spaced from said extrusion head and having its inner periphery aligned with the outside of said orifice so as to form a second annular orifice of increasing cross-sectional area with respect to said first orifice; an expander ring secured to said tubular member and spaced from said second orifice, said expander ring having an outer diameter equal to the inner diameter of the finished tubing; means to submerge the extruded tubing in cooling water; means to circulate cooling water in and out of the extruded tubing in direct contact with said tubing; means to supply fluid pressure to the interior of the extruded tubing between said second orifice and said expander ring so as to stretch said tubing; and means to remove said cooled tubing.

9. The apparatus of claim 8 wherein said inside and outside forming rings are spaced from about 0.001 to about 0.015 inch from extrusion head.

10. The apparatus of claim 7 wherein the cross-section area of said second annular orifice is increased from about 1 to about 50 percent.

11. The apparatus of claim 8 wherein the cross-sectional area of said second annular orifice is increased from about 20 to about 30 percent.

12. The apparatus of claim 8 wherein means are provided to introduce cooling fluid to the exterior surface of the extruded tubing substantially immediately downstream from said second orifice.

13. Apparatus for forming biaxially oriented linear polymer film tubing comprising, in combination, an extrusion head containing a first annular orifice; a tubular member axially disposed with respect to said orifice; an inside forming ring secured to said tubular member adjacent to and spaced from said extrusion head and having its outer periphery aligned with the inside of said orifice; an outside forming ring adjacent to and spaced from said extrusion head and having its inner periphery aligned with the outside of said orifice so as to form a second annular orifice of increasing cross-sectional area with respect to said first orifice; an expander ring secured to said tubular member and spaced from said second orifice, said expander ring having an outer diameter equal to the inner diameter of the finished tubing; means to submerge the extruded tubing in cooling water; means to circulate cooling water in and out of the extruded tubing comprising a first conduit within said tubular member to introduce water through a first series of perforations in said tubular member and a second conduit in said tubular member to withdraw water through a second series of perforations in said tubular member; means to supply fluid pressure to the interior of the extruded tubing between said second orifice and said expander ring so as to stretch said tubing; and means to remove said cooled tubing.

References Cited in the file of this patent

UNITED STATES PATENTS

| | | |
|---|---|---|
| 2,433,937 | Tornberg | Jan. 6, 1948 |
| 2,720,680 | Gerow | Oct. 18, 1955 |
| 2,760,228 | Verges | Aug. 28, 1956 |
| 2,919,467 | Mercer | Jan. 5, 1960 |

UNITED STATES PATENT OFFICE
CERTIFICATE OF CORRECTION

Patent No. 3,108,324　　　　　　　　　　　　　　October 29, 1963

Fredrick J. Zavasnik

It is hereby certified that error appears in the above numbered patent requiring correction and that the said Letters Patent should read as corrected below.

Column 6, line 52, for the claim reference numeral "7" read -- 8 --.

Signed and sealed this 9th day of June 1964.

SEAL)
Attest:

ERNEST W. SWIDER
Attesting Officer

EDWARD J. BRENNER
Commissioner of Patents